United States Patent Office 3,395,084
Patented July 30, 1968

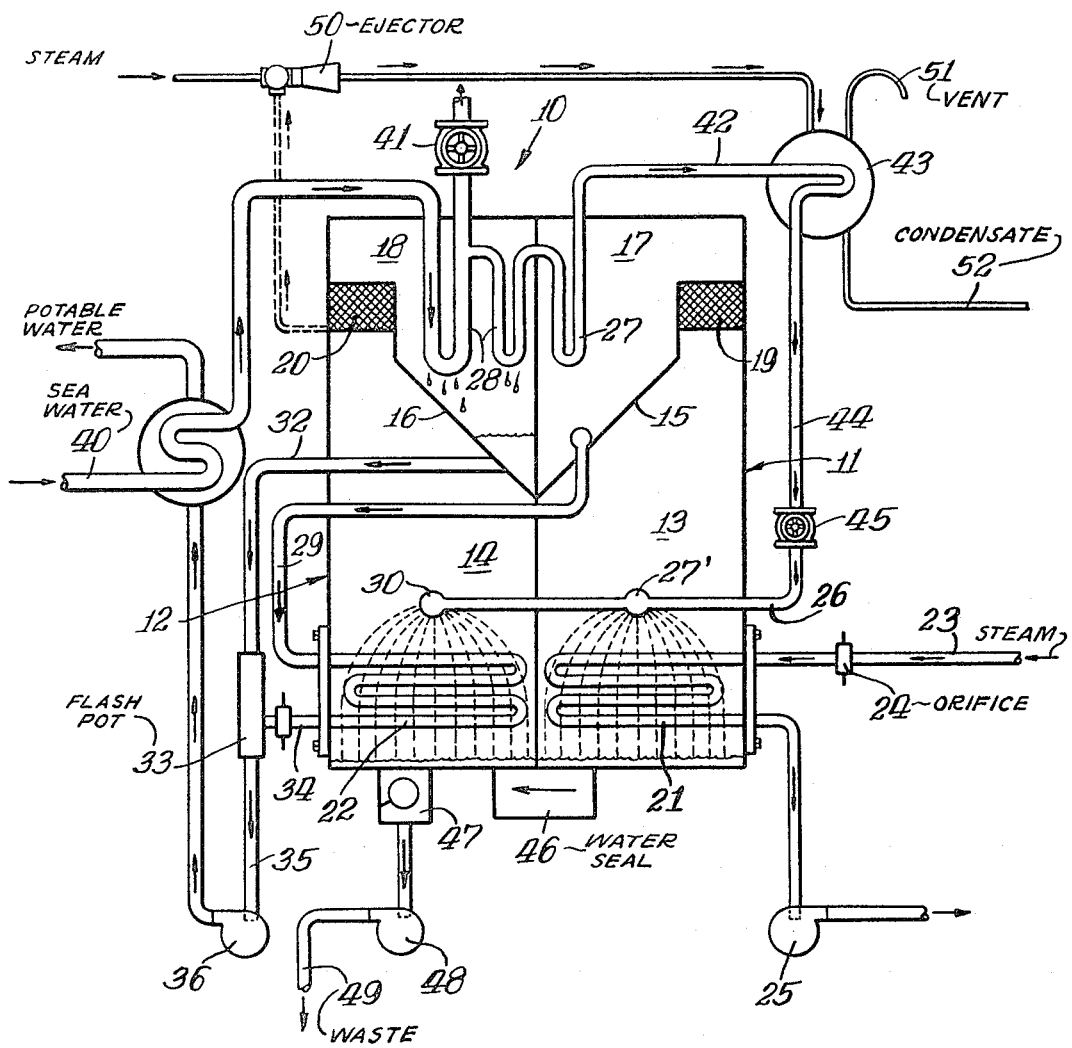

3,395,084
MULTISTAGE STILL WITH HOT CONDENSATE STAGEHEATER
Frederick A. Loebel, Milwaukee, and Armando B. Steinbruchel, Waukesha, Wis., assignors to Aqua-Chem, Inc., a corporation of Wisconsin
Filed Dec. 14, 1964, Ser. No. 418,053
2 Claims. (Cl. 202—173)

ABSTRACT OF THE DISCLOSURE

This invention provides a flash evaporating apparatus in which sea water to be evaporated is sprayed on heated tubes in each chamber so as to form a film thereover, with the tubes being heated by an external source in the flash chamber under the highest pressure, and the distillate condensed from the vapors formed in the last-mentioned flash chamber are passed through tubes in flash chambers lower in pressure so as to form the source of heat for evaporation of vapors therein. Subsequently, the distillates condensed in the condensing chambers associated with each flash chamber and combined with the distillate used for heating as aforesaid.

---

This invention relates to evaporators and more particularly to a flash evaporator wherein water to be evaporated is formed as a thin film upon a heated surface.

It is a general object of the present invention to produce a new and improved evaporator of the character described.

It is a more specific object of the invention to produce an evaporator wherein water to be distilled is applied as a thin film to a heated surface to distill vapors therefrom with the vapors being subsequently condensed as distillate in the usual manner.

It is a further object of the invention to produce an evaporator wherein water to be distilled is sprayed onto heated tubes in each stage of a multistage evaporator to form a film of water on the tubes from which water vapor is evolved thereby producing an evaporator having exceedingly high thermal efficiency and productive capacity.

Other objects and advantages of the present invention will be readily apparent to those skilled in the art from the following description and accompanying drawing, which is a somewhat schematic view of a two stage evaporator incorporating the features of the present invention.

While this invention is susceptible of embodiment in many different forms, there is shown in the drawing and will herein be described in detail a specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing, there is shown an evaporator 10 having a first stage 11 and a second stage 12. In the stages there are provided flash chambers, 13 and 14 respectively, separated by plates 15 and 16 from condensing chambers 17 and 18. Vapors generated in the flash chambers 13 and 14 may pass into the respective condensing chambers through entrainment separators 19 and 20.

Means in each of the flash chambers provide heated surfaces over which a film of water is maintained, the means comprising, in the particular embodiment of the invention shown, a first bank of tubes 21 in the chamber 13 and a second bank of tubes 22 in the chamber 14. A source of steam (not shown) supplies steam to line 23 which after passing through orifice 24 is directed into the bank of tubes 21 thereby to heat the surface of the tubes. The condensate from the steam after passing through the tube bank is removed by the pump 25.

Water to be distilled is introduced into the first stage 13 through pipe 26. A spray nozzle 27' directs the water as a spray onto the tube bank 21 to form a film of water thereon. Vapors flashed from the film pass upwardly in the stage and through the entrainment separator (demister) 19 and thence into the condensing chamber 17. Cooled surfaces in the form of tubes 27 are located in the chamber 17 and the water vapors condense thereon, passing to the bottom of the chamber from which they are removed through line 29 and thence are directed into the tube bank 22. Inasmuch as the distillate from the chamber 17 is still at an elevated temperature, the surfaces of the tube bank 22 are heated thereby so that water directed thereonto through spray nozzle 30 is heated and vaporized. Water vapors evolving from the film on the tube bank 22 pass upwardly in the second stage flash chamber 14 through the separator 20 and into the condensing chamber 18 where the water is condensed on the cooled tubes 28. Condensate formed in the chamber 18 is removed through line 32 which is connected through a flash pot 33 to the line 34 serving as the exit for the distillate passing through the tube bank 22. Both distillate flows are combined in the pipe 35 and pumped by the distillate pump 36 to storage.

Water to be distilled, for example sea water, enters the system through feed line 40 and thence passes into the tubes 28 in the condensing chamber 18. Some of the sea water is directed by valve 41 overboard and the balance flows through the remainder of the tubes 28 and thence through tubes 27 into the condensing chamber 17. Feed water exiting from the chamber 17 passes through line 42 into an after-condenser 43 and thence into line 44 which, through the control of valve 45, is connected to the line 26. Unvaporized water in the first stage is directed by means of the water seal 46 into the second stage 14 and thence through discharge 47 and brine pump 48 to the waste line 49.

A steam ejector 50 is connected to the second stage to maintain the proper pressure gradients, and then to the after-condenser 43. The latter is vented to the atmosphere through the line 51 and condensate is collected through line 52.

It will be apparent to those skilled in the art that the principles of the present invention may be utilized in evaporator units having a number of stages. For purposes of illustration only two stages are shown, although the number can be increased with the resulting increase in efficiency. Furthermore, the utilization of a spray to form a film on the banks of tubes not only increases the efficiency of the system, but serves to reduce foaming. The heat transfer efficiency is very good and inasmuch as the spray is made up of relatively fine water droplets, there is little or no erosional effect on the tubes as would be present if a high velocity stream or jet of water was employed.

We claim:
1. A multistage sea water evaporating plant comprising, a shell, means in the shell dividing the same into a plurality of stages from a first stage maintained at a higher pressure to a last stage maintained at a lower pressure, means in each stage dividing the same into a flash chamber and a condensing chamber, means providing a passage for vapors formed in the flash chamber of each stage into the condensing chamber of the same stage, a bank of heating tubes in each flash chamber above the liquid level, means for passing steam through the heating tubes in the first stage to heat the same, means for delivering sea water as a spray onto the surface of said heating tubes in the first stage to cause a portion of said sea water to vaporize, the vapors formed in the flash chamber of the first stage passing by said passage means into the condensing chamber associated with said first stage, a plurality of condensing tubes in each condensing chamber, with the condensing tubes in each condensing chamber except the condensing chamber associated with the first stage being connected to the condensing tubes in the next higher stage condensing chamber with respect to temperature and pressure gradients, means for passing sea water through at least some of the condensing tubes in a condensing chamber prior to the first stage and then discharging the major portion of the last-mentioned sea water to waste, the minor portion of said last-mentioned sea water passing into the condensing tubes in the condensing chamber associated with the next higher stage, means for passing the distillate formed in the condensing chamber associated with the first stage through the bank of heating tubes in the flash chamber of the next lower stage as the sole source of heat for heating the same, means for spraying sea water to be evaporated onto the heating tubes in the flash chamber in said next lower stage to evaporate a portion of said sea water, the vapors formed in said next lower stage passing into the condensing chamber associated with said next lower stage to condense the vapors, and means for combining the distillate removed from the condensing chamber associated with said next lower stage with the distillate passing through the heating tubes thereof.

2. A multistage sea water evaporating plant comprising, a shell, means in the shell dividing the same into a plurality of stages from a first stage maintained at a higher pressure to a last stage maintained at a lower pressure, means in each stage dividing the same into a flash chamber and a condensing chamber, means providing a passage for vapors formed in the flash chamber of each stage into the condensing chamber of the same stage, a bank of heating tubes in each flash chamber above the liquid level, means for passing steam through the heating tubes in the first stage to heat the same, means for delivering sea water as a spray onto the surface of said heating tubes in the first stage to cause a portion of said sea water to vaporize, the vapors formed in the flash chamber of the first stage passing by said passage means into the condensing chamber associated with said first stage, a plurality of condensing tubes in each condensing chamber, with the condensing tubes in each condensing chamber except the condensing chamber associated with the first stage being connected to the condensing tubes in the next higher stage condensing chamber with respect to temperature and pressure gradients, means for passing sea water through at least some of the condensing tubes in a condensing chamber prior to the first stage and then discharging the major portion of the last-mentioned sea water to waste, the minor portion of said last-mentioned sea water passing into the condensing tubes in the condensing chamber associated with the next higher stage, means for passing the distillate formed in the condensing chamber associated with the first stage through the bank of heating tubes in the flash chamber of the next lower stage as the sole source of heat for heating the same, and means for spraying sea water to be evaporated onto the heating tubes in the flash chamber in said next lower stage to evaporate a portion of said sea water, the vapors formed in said next lower stage passing into the condensing chamber associated with said next lower stage to condense the vapors.

References Cited

UNITED STATES PATENTS

| 789,159 | 5/1905 | Lillie | 159—20 |
| 990,878 | 5/1911 | Kauffman | 159—13 X |
| 1,200,996 | 10/1916 | Soderlund et al. | 159—24 |
| 2,368,588 | 1/1945 | Worthen et al. | 202—174 |
| Re. 25,232 | 8/1962 | Goeldner | 202—173 X |
| 3,252,501 | 5/1966 | Loebel et al. | 159—13 X |

NORMAN YUDKOFF, *Primary Examiner.*

J. SOFER, *Assistant Examiner.*